(12) United States Patent
Trump et al.

(10) Patent No.: US 12,465,937 B2
(45) Date of Patent: Nov. 11, 2025

(54) SENSOR FOR DETERMINING THE OSCILLATING FREQUENCY IN A FLUIDIC OSCILLATING NOZZLE AND A METHOD USING THE SENSOR

(71) Applicant: STRATEC SE, Birkenfeld (DE)

(72) Inventors: Martin Trump, Pforzheim (DE); Michael Burkart, Waldbronn (DE); Raphael Wieczorek, Enzklösterle (DE); Fabian Hinderer, Ölbronn Dürrn (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 17/539,786

(22) Filed: Dec. 1, 2021

(65) Prior Publication Data

US 2022/0280963 A1   Sep. 8, 2022

(30) Foreign Application Priority Data

Mar. 4, 2021 (LU) ........................................ 102636

(51) Int. Cl.
| | |
|---|---|
| *B05B 12/00* | (2018.01) |
| *B05B 17/06* | (2006.01) |
| *G01D 5/20* | (2006.01) |
| *G01L 1/16* | (2006.01) |
| *G01L 1/22* | (2006.01) |
| *G01L 13/00* | (2006.01) |
| *G01P 15/00* | (2006.01) |

(52) U.S. Cl.
CPC ........ *B05B 12/008* (2013.01); *B05B 17/0653* (2013.01); *G01D 5/20* (2013.01); *G01L 1/16* (2013.01); *G01L 1/22* (2013.01); *G01L 13/00* (2013.01); *G01P 15/00* (2013.01)

(58) Field of Classification Search
CPC ........ G01F 1/32; G01F 1/3287; G01F 1/3282; G01F 1/3273; G01F 1/3259; G01F 1/325; G01F 1/3227; G01P 13/0086
See application file for complete search history.

(56) References Cited

U.S. PATENT DOCUMENTS

| | | | | |
|---|---|---|---|---|
| 3,788,141 A | * | 1/1974 | Blackwell ............ | G01F 1/3282 73/861.23 |
| 3,902,367 A | * | 9/1975 | Grant .................... | G01F 1/3227 137/833 |

(Continued)

FOREIGN PATENT DOCUMENTS

| | | |
|---|---|---|
| EP | 0269384 A1 | 6/1988 |
| EP | 3146897 A1 | 3/2017 |
| FR | 2754342 A1 | 4/1998 |

*Primary Examiner* — Tran M. Tran
(74) *Attorney, Agent, or Firm* — William Gray Mitchell

(57) ABSTRACT

A sensor for determining the oscillating frequency in a fluidic oscillating nozzle and provides an oscillating nozzle, comprising a fluidic oscillator with inlet and outlet and a main channel and at least one control passage surrounding the main channel, and a splitter comprising at least two splitter channels which is attached to the outlet of the fluidic oscillator, wherein the sleeve of at least one of the at least two splitter channels comprises partially a flexible foil. The invention also relates to a method for monitoring a dispensed fluid jet, comprising the steps of providing an oscillating nozzle as described above; and injecting a fluid jet and in parallel determining the oscillation frequency by determining the deformation changes of the flexible foil.

17 Claims, 14 Drawing Sheets

(56) References Cited

U.S. PATENT DOCUMENTS

| | | | | |
|---|---|---|---|---|
| 4,182,172 A | * | 1/1980 | Wennberg | G01F 1/3227 73/861.19 |
| 4,550,614 A | * | 11/1985 | Herzl | G01F 1/3227 73/861.19 |
| 4,838,091 A | * | 6/1989 | Markland | G01F 1/3227 73/861.19 |
| 4,930,357 A | * | 6/1990 | Thurston | G01F 1/3227 73/861.19 |
| 4,949,755 A | * | 8/1990 | Thurston | G01F 1/3227 137/833 |
| 5,003,810 A | * | 4/1991 | Jepson | G01F 5/00 73/861.74 |
| 5,063,786 A | * | 11/1991 | Sanderson | G01F 1/3227 73/861.19 |
| 5,127,173 A | * | 7/1992 | Thurston | G01F 1/44 73/202 |
| 5,339,695 A | * | 8/1994 | Kang | G01F 1/7084 73/195 |
| 5,363,704 A | * | 11/1994 | Huang | G01F 1/3227 137/842 |
| 5,396,808 A | * | 3/1995 | Huang | G01F 1/3227 137/833 |
| 5,463,904 A | * | 11/1995 | Kalinoski | G01F 1/3218 73/861.24 |
| 5,638,867 A | * | 6/1997 | Huang | F15C 1/22 137/842 |
| 5,756,900 A | * | 5/1998 | Arie | G01L 19/0023 73/756 |
| 5,808,209 A | * | 9/1998 | Zielinska | G01F 1/3209 73/861.22 |
| 5,827,976 A | * | 10/1998 | Stouffer | G01F 1/3227 385/13 |
| 5,847,288 A | * | 12/1998 | Hutchinson | G01P 13/0086 73/861.75 |
| 5,864,067 A | * | 1/1999 | Ligneul | G01F 1/667 73/861.21 |
| 6,003,383 A | * | 12/1999 | Zielinska | G01F 1/3218 73/861.22 |
| 6,131,470 A | * | 10/2000 | Guizot | G01F 1/3227 73/861.19 |
| 6,367,333 B1 | * | 4/2002 | Bullister | A61M 60/178 73/715 |
| 6,536,946 B1 | * | 3/2003 | Froelich | G01N 33/225 374/36 |
| 6,938,489 B2 | * | 9/2005 | Esashi | G01L 9/0017 73/704 |
| 7,021,148 B2 | * | 4/2006 | Kuhn | A61M 1/3639 73/714 |
| 7,259,574 B2 | * | 8/2007 | Shrikrishna | B06B 1/0622 324/681 |
| 7,383,740 B2 | * | 6/2008 | Krasilchikov | A61M 15/0025 73/861.19 |
| 7,464,609 B2 | * | 12/2008 | Fallet | G01F 1/34 73/861.19 |
| 7,793,554 B2 | * | 9/2010 | Schmitt | G01F 1/3266 73/861.24 |
| 7,827,870 B2 | * | 11/2010 | Cottam | G01F 1/58 73/861.19 |
| 8,091,434 B2 | * | 1/2012 | Vaidya | G01F 1/3227 73/861.19 |
| 8,136,413 B2 | * | 3/2012 | Sanderson | G01F 1/72 73/861.19 |
| 8,201,462 B2 | * | 6/2012 | Vaidya | G01F 1/3227 73/861.61 |
| 8,573,066 B2 | * | 11/2013 | Schultz | G01F 1/3227 73/861.19 |
| 8,733,401 B2 | * | 5/2014 | Schultz | E21B 28/00 137/15.01 |
| 9,134,152 B2 | * | 9/2015 | Sanderson | G01F 1/72 |
| 9,140,619 B2 | * | 9/2015 | Wu | G01L 9/0022 |
| 9,170,135 B2 | * | 10/2015 | Soreefan | G01F 15/006 |
| 9,706,946 B2 | * | 7/2017 | Brimer | A61B 5/7275 |
| 10,646,886 B2 | * | 5/2020 | Bobusch | B05B 15/40 |
| 10,724,879 B2 | * | 7/2020 | Kumar | G01F 1/3209 |
| 10,948,110 B2 | * | 3/2021 | Panagotopulos | F16L 49/06 |
| 10,960,157 B2 | * | 3/2021 | Salamitou | G01F 1/3227 |
| 11,471,898 B2 | * | 10/2022 | Bobusch | B05B 1/08 |
| 11,841,251 B2 | * | 12/2023 | Molinazzi | G01F 15/00 |
| 11,878,315 B2 | * | 1/2024 | Nowak | B05B 15/50 |
| 11,931,757 B2 | * | 3/2024 | Nowak | B01J 2/006 |
| 11,951,492 B2 | * | 4/2024 | Hinderer | B05B 1/30 |
| 2011/0071773 A1 | * | 3/2011 | Saylor | G01D 9/005 702/45 |
| 2017/0136472 A1 | * | 5/2017 | Gopalan | B05B 17/04 |
| 2017/0276527 A1 | * | 9/2017 | Chen | G01F 1/6965 |
| 2018/0318848 A1 | * | 11/2018 | Bobusch | F15B 21/12 |

* cited by examiner

SENSOR FOR DETERMINING THE OSCILLATING FREQUENCY IN A FLUIDIC OSCILLATING NOZZLE AND A METHOD USING THE SENSOR

CROSS-REFERENCE TO RELATED APPLICATIONS

The present application claims priority to Luxembourg Patent Application No. LU102636 filed on Mar. 4, 2021. The aforementioned application is hereby incorporated by reference in its entirety.

BACKGROUND OF THE INVENTION

Field of the Invention

The invention relates to sensor for determining the oscillating frequency in a fluidic oscillating nozzle and a method for monitoring a dispensed fluid jet.

Brief Description of the Related Art

Automated analyzer systems for use in clinical diagnostics and life sciences are produced by a number of companies. For example, STRATEC® SE, Birkenfeld, Germany, produces a number of devices for specimen handling and detection for use in automated analyzer systems and other laboratory instrumentation.

STRATEC designs and manufactures automated analyzer systems which are used for instance in diagnostic applications. Said analyzer systems may comprise flow sensors and oscillation nozzles which are usually used for cleaning purposes or for producing an oscillating jet at high frequency. It is a characteristic of all fluidic oscillators that there has to be a kind of feedback mechanism to drive the oscillations.

When using fluidic oscillating nozzles as a flow sensor, the oscillation frequency is usually measured by electrodes which are inserted into or are in contact with the liquid. However, since this metallic/conductive contacting of the liquid is usually not desired or permitted in diagnostic analysis devices, the present invention shall provide a solution of measuring the oscillation frequency without using a metal that gets in contact with the liquid or fluid.

Fluidic oscillating nozzles are usually used to generate a fluid jet oscillating without having to rely on moving parts and/or active components. This technology is therefore regularly used where there are very harsh environmental conditions or where costs must be kept very low. Since the oscillation frequency of these oscillating nozzles is directly dependent on the flow rate, they can also be used as flow sensors if the oscillation frequency is detected in the nozzle. Usually electrically conductive electrodes are inserted into the nozzle for this purpose. In addition, there are many other methods to measure the flow velocity of liquids, e.g., thermoelectric, ultrasonic, or Coriolis based methods.

The prior art also describes certain devices which provide an oscillating nozzle having a so-called splitter mounted to its outlet. Through the splitter, the liquid flows through only one of the two channels at a time. In the other channel the liquid is at a standstill. This creates an overpressure in the channel through which the liquid flows and a negative pressure in the channel through which it does not flow.

The prior art further describes devices using a thermal process for determining the oscillations frequency. In this process a thermocouple is inserted into a side channel of the oscillating nozzle and heated by a current flow. The oscillating flow in the area of the thermocouple then cools down which can be detected.

Another method for determining the oscillation frequency in an oscillating nozzle is the use of a floating element. In the middle of the splitter is a chamber arranged which is connected to both channels of the splitter via thin channels. In this chamber is a floating element accommodated, e.g., a ball which is deflected alternately to one side and the other by the over- or under pressure in the two channels. The movement of the ball is then detected, e.g., inductively or capacitively.

In order to measure the oscillation frequency magnetically, electrically conductive electrodes are inserted into the oscillating nozzle. In addition, an electric field is generated around the nozzle. By charge separation an electric voltage is formed between the electrodes which varies with according to the oscillation. The frequency of the measured voltage is therefore identical to the oscillation frequency.

The oscillation of a liquid or fluid in the nozzle can also cause the housing of the nozzle to vibrate, which can be measured by a structure-borne sound microphone, a piezo element or an acceleration sensor.

In diagnostic equipment, like an automated analyzer for performing biochemical assays, it is a disadvantage or even to be avoided that a liquid gets in contact with other materials, e.g., metals, in order to avoid a contamination of the respective liquid. Therefore, the magnetic inductive method is not suitable in diagnostic analyzer systems.

Moving parts, as described in the example employing a floating element, are also susceptible to the unintended deposition of materials, which may cause the floating element to become stuck with such materials which can be regarded as a contamination.

The thermal method tends to be slow which is disadvantageous, and therefore less suitable for higher measuring resolutions or oscillation frequencies. Indirectly measuring structure-borne noise or vibration of the housing, the extraction of the oscillation frequency from the ambient noise is susceptible to interference which may cause results reflecting the influence of the ambient noise so that this method is error prone.

Published French Patent Application FR 2 754 342 A1 relates to a cell for converting differential pressure into an electric signal comprising: two chambers filled with an incompressible fluid each delimited by a membrane capable of being deformed by the action of external pressure and separated from each other by a rigid wall; a sensor associated with said wall, sensitive to the difference of pressure exerted on either side of the wall and delivering in response an electric signal. The cell according to this document is characterised in that at least one passage is provided between the two chambers and having dimensions adapted for at least attenuating a spurious pressure difference occurring on either side of the wall with a low or even no frequency, and for enabling said sensor to detect the pressure difference exerted on either side of the wall with higher frequencies.

Published European Patent Application EP 3 146 897 A1 discloses an oxygen therapy monitoring device comprising an oscillation chamber comprised in a gas flow path adapted to pass a gas flow from a source to a breathing interface for a person. The oscillation chamber induces an oscillation in the gas flow that varies as a function of a flow rate of the gas flow. A measurement arrangement measures the oscillation induced in the gas flow and determines the flow rate on the basis of the oscillation that is measured.

Published European Patent Application EP 0 269 384 A1 relates to a fluidic device having an inlet and a flow path extending from the inlet to an outlet. A part of the flow path defines a power jet nozzle upstream of and leading to an interaction chamber. The interaction chamber leads to the outlet. A splitter is spaced from the power nozzle across the interaction chamber and is in alignment therewith to separate a pair of feedback inlets leading from the interaction chamber. A pair of feedback channels extend from the pair of feedback inlets to respective feedback outlets. The feedback outlets are oppositely disposed perpendicularly to the power nozzle and intermediate the latter and the interaction chamber. A branch passage extends from each feedback channel to a respective variable-volume chamber which is bounded by a flexible diaphragm. The diaphragms are movable in response to pressure variations within the respective variable-volume chamber and are each associated with a transducer for producing an output signal in response to such movement. Fluid flow restrictions are provided in each branch passage for resisting dynamic oscillation (ringing) of fluid flow in the feedback channels with the variable volume of fluid in the variable-volume chambers.

Thus, there is a need for an alternative device and method for determining the oscillating frequency in an oscillating nozzle.

SUMMARY OF THE INVENTION

It is an object of this invention to provide a device and a method for determining the oscillation frequency in fluidic oscillating nozzles.

The present invention provides an oscillating nozzle, comprising
  a fluidic oscillator with inlet and outlet and a main channel and at least one control passage surrounding the main channel, and
  a splitter comprising at least two splitter channels which is attached to the outlet of the fluidic oscillator, wherein the sleeve of at least one of the at least two splitter channels comprises partially a flexible foil.

In a further aspect of the present invention, the outlet of the fluidic oscillator before the splitter is a gorge portion.

In another embodiment of the present invention, the outer surface of the flexible foil can be coated with a conductive material.

In another aspect of the present invention, two counter electrodes can be arranged with a predefined distance next to the conductively coated outer surface of the flexible foil.

The present invention may further encompass an embodiment, wherein the two counter electrodes are part of a circuit board.

In another aspect of the present invention, a single counter electrode can be configured to be in a distance next to the conductively coated outer surface of the flexible foil so that the conductive coating of the outer surface of the flexible foil and a surface of the single counter electrode can be used for measuring a capacity change.

Another embodiment of the present invention comprises an inductive sensor which is arranged with a predefined distance next to the conductively coated outer surface of the flexible foil.

It can further be intended that the flexible foil is on the outer surface of the sleeve surrounded by a sealed housing and a pressure sensor is arranged within the said sealed housing.

The present invention may further encompass an embodiment, wherein each of the at least two splitter channels is partly covered with a flexible foil and each of the flexible foils is surrounded by a sealed housing, wherein the housings are connected by a channel which comprises a differential pressure sensor.

In another aspect of the present invention, a piezo element or a piezo foil can be attached to the outer surface of the flexible foil.

The present invention encompasses further an embodiment, wherein a strain gauge is attached to the outer surface of the flexible foil.

In another aspect of the present invention, an acceleration sensor can be attached to the outer surface of the flexible foil.

It is also intended that the outer surface of the flexible foil can be coated with a reflecting material.

Another embodiment may encompass a light source that illuminates the reflective outer surface of the flexible foil and a light sensor detects the amount and/or direction of reflected light.

The present invention comprises an embodiment, wherein the flexible foil is made of a translucent material and a light source which is arranged outside the splitter channel illuminates through the flexible foil the inner volume of the splitter channel and a light sensor is arranged inside the splitter channel opposite the translucent flexible foil for detecting the amount and/or direction of light passing through the foil.

Another object of the present invention is a method for monitoring a dispensed fluid jet, comprising the steps of
  Providing an oscillating nozzle as described above;
  Injecting a fluid jet and in parallel determining the oscillation frequency by determining the deformation changes of the flexible foil.

In a further aspect of a method according to the present invention, the oscillation frequency of the fluid is determined by measuring capacity changes, electromagnetic induction, pressure changes, differential pressure changes, piezoelectricity, changes of the shape of the flexible form and acceleration on the surface of the flexible foil or refractive changes of a translucent flexible foil Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION AND THE FIGURES

The technical problem is solved by the independent claims. The dependent claims cover further specific embodiments of the invention.

The invention relates to a device and method for determining oscillation frequencies in a fluidic oscillating nozzle.

The term "outer" refers to the outside of a channels sleeve, so that an outer surface is directed towards the surrounding environment and the inner surface is directed towards the inner part of a channel.

The term "conductive material" refers to any material that is suitable for conducting electricity or an electrical potential.

The term "predefined distance" refers to a distance between electrically conductive surfaces so that they are separated by an air gap for instance. Such a predefined distance may allow or prohibit a contact of the separated conductive surfaces.

A basic idea of the present invention is the at least partly replacement of the cover in the area of the two splitter channels of an oscillating nozzle with a flexible foil. The foil or film replaces at least partly the sleeve of at least one of the splitter channels and can basically be applied in different areas of the splitter or oscillator. Several foils and thus several measuring points are also conceivable.

Figure 1:
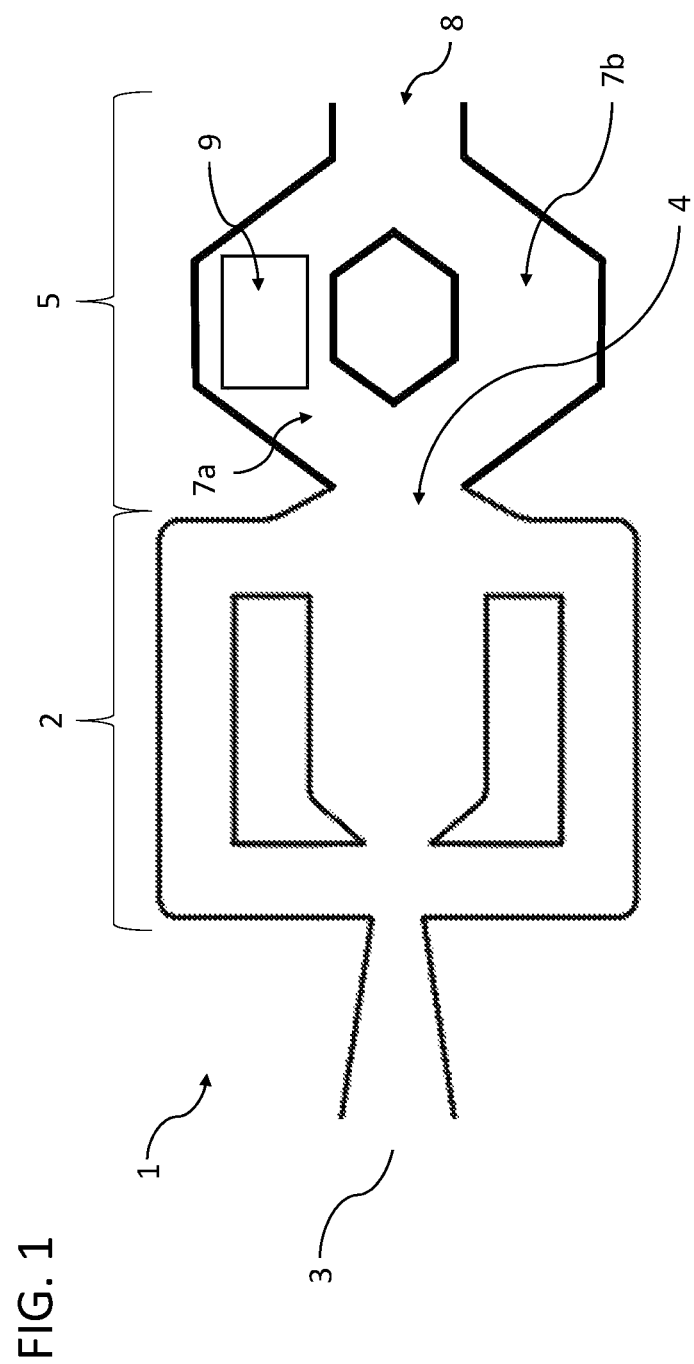
FIG. 1 shows an embodiment with a flexible foil.

FIG. 1 shows an oscillating nozzle 1 which comprises a fluidic oscillator 2 with an inlet 3 and an outlet 4. A splitter 5 is attached to the outlet 4 of the fluidic oscillator 2. The splitter 5 has two splitter channel 7 merging an outlet 8 of the splitter. The sleeve of one of the splitter channels 7a, 7b is partly replaces by a flexible foil or film 9. The flexible foil 9 may be arranged at any place of the oscillating nozzle but preferably in the splitter sleeve as outlet 4 of the fluidic oscillator may be formed as a narrowing. When a fluid, e.g., a liquid, flows through the first splitter channel 7a, an overpressure is created, which deforms the foil convex. When the liquid flows through the second splitter channel 7b, a negative pressure is created in the first splitter channel 7a, which causes the film to deform concave. Thereby the film pulsates with the oscillation frequency.

Figure 2B:
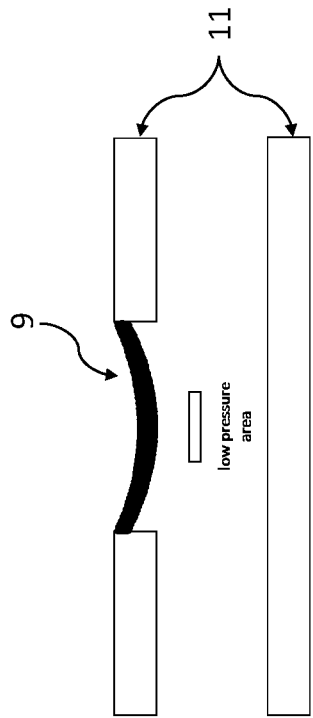
FIGS. 2A and 2B show a concave or convex shape of a foil.
Figure 2A:
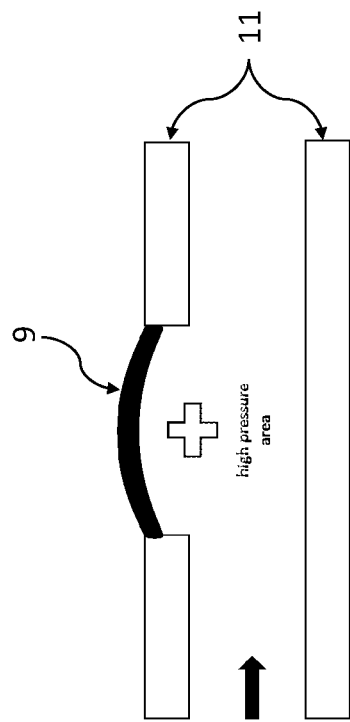

The flexible foil 9 is at least partly replacing the sleeve 11 of the splitter channel and will with respect to the changing pressure in the splitter channels alternately be convex (FIG. 2A) if the pressure in the splitter channel is high or concave (FIG. 2B) if the pressure in the splitter channel is low. This deformation or the change in the direction of the deformation of the foil can be measured, and the result may be used as a measure for the actual oscillation frequency. The measurement of the deformation can be done by different measuring principles, which will be described in detail below.

By separating the fluidic oscillator and the measuring chamber (i.e., the splitter arrangement with flexible foil) of an oscillating nozzle, the dimensioning of the actual oscillating nozzle remains flexible and is not restricted by other requirements resulting from the measurement. The pressure differences and thus the deformation of the foil can be increased by a narrowing behind the splitter.

Figure 3:
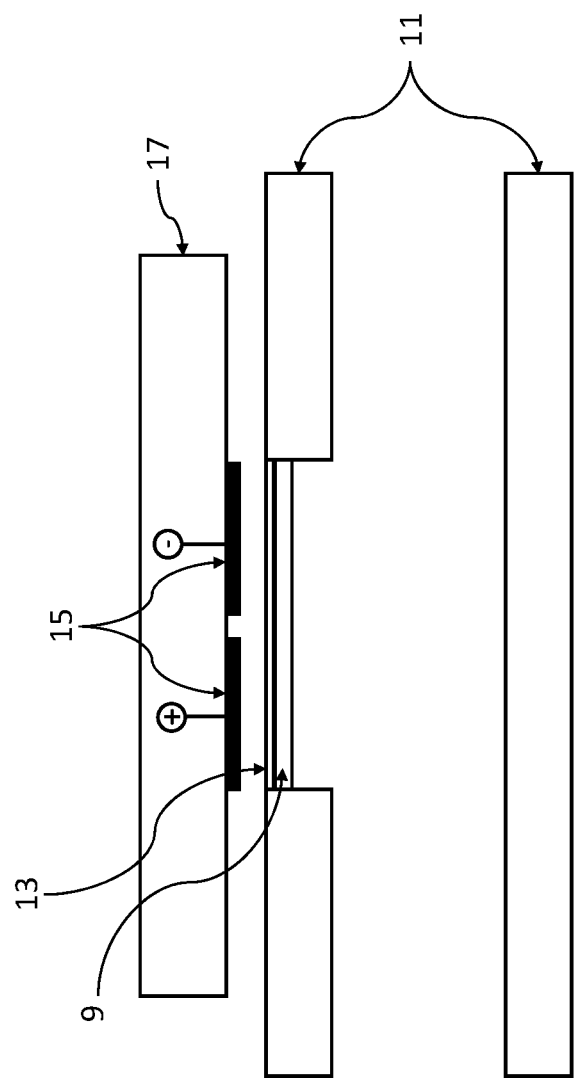
FIG. 3 shows an embodiment measuring capacity changes.

The deformation of the foil may be measured by determining capacity changes (FIG. 3). In this process, the flexible foil 9 is coated/vaporized to be electrically conductive by applying a conductive layer 13. Together with two counter-electrodes which are e.g., part of a printed circuit board, a capacitor 15 is formed with an air layer in between as dielectric. The capacity of this capacitor 15 depends directly on the distance between the electrodes. The deformation of the film therefore changes the distance and thus the capacitance, which can be measured by a suitable electronic circuit which is part of a circuit board 17, e.g., an electric resonant circuit. This method has the advantage that the conductive layer 13 on the flexible foil 9 does not have to be contacted directly electrically.

Figure 4:
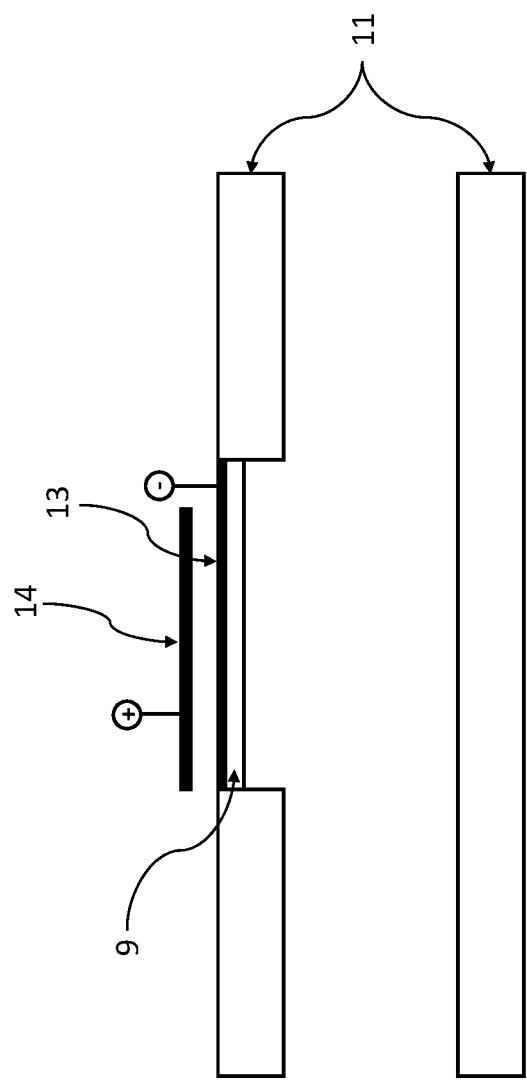
FIG. 4 shows an embodiment with a single counter electrode.

It is also envisaged that a capacitance measurement with only one counter electrode 14 is used (FIG. 4). This method works on the same principle, but with only one counter-electrode 14, which is why the second electrode is formed by the conductive layer 13 on the flexible foil 9 and must therefore be directly electrically contacted.

Figure 5:
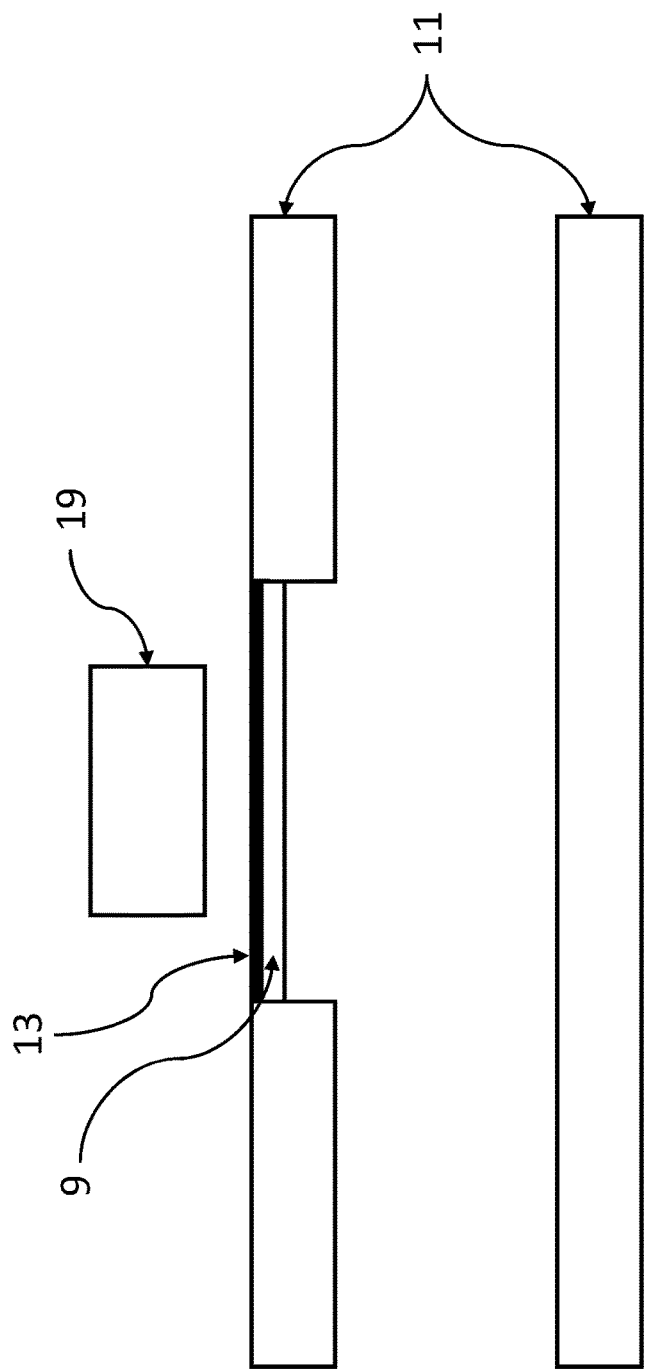
FIG. 5 shows an embodiment for an inductive measurement.

FIG. 5 shows an embodiment for an inductive measurement which is achieved using an inductive sensor 19 which is arranged above the flexible foil 9 that is covered with a conductive layer 13.

Figure 6:
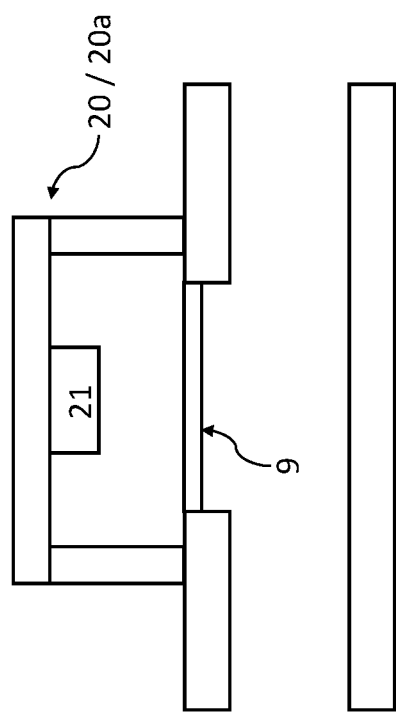
FIG. 6 shows an embodiment for determining pressure changes.

FIG. 6 shows an embodiment for determining pressure changes caused by the deformation of the flexible foil 9. In this process the area above the film is hermetically sealed by a housing 20 and the pressure change in the resulting chamber 20a caused by the deformation of the flexible foil 9 is measured by pressure sensor 21.

Figure 7:
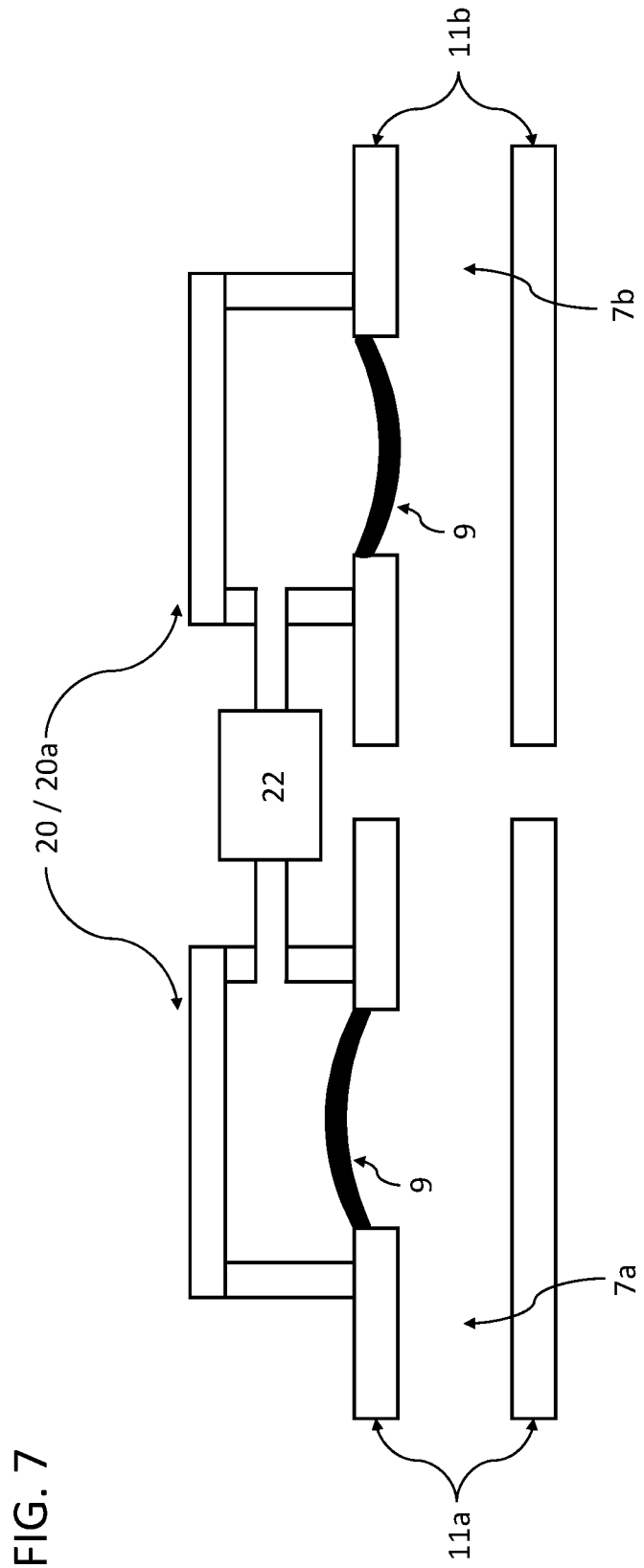
FIG. 7 shows an embodiment for differential pressure determination.

Another possibility for measuring the changing deformations of the flexible foil 9 is a differential pressure determination (FIG. 7). This method is an extension of the simple pressure measurement method. Here, in both channels of the splitter, a first splitter channel 7a and a second splitter channel 7b, the sleeve of the first splitter channel 11a and the sleeve of the second splitter channel 11b, respectively, are at least partly covered with a flexible foil 9. These two channels are flowed through with a 180° phase shift, which is why the associated foils always deform in opposite directions. If pressure measuring chambers 20a are placed above the flexible foils 9 in each splitter channel and the pressure difference between these chambers is measured by a differential pressure sensor 22, the oscillation frequency can be measured. In contrast to the simple pressure measurement, the amplitude of the measured signal doubles, which leads to a more robust system.

Figure 8:
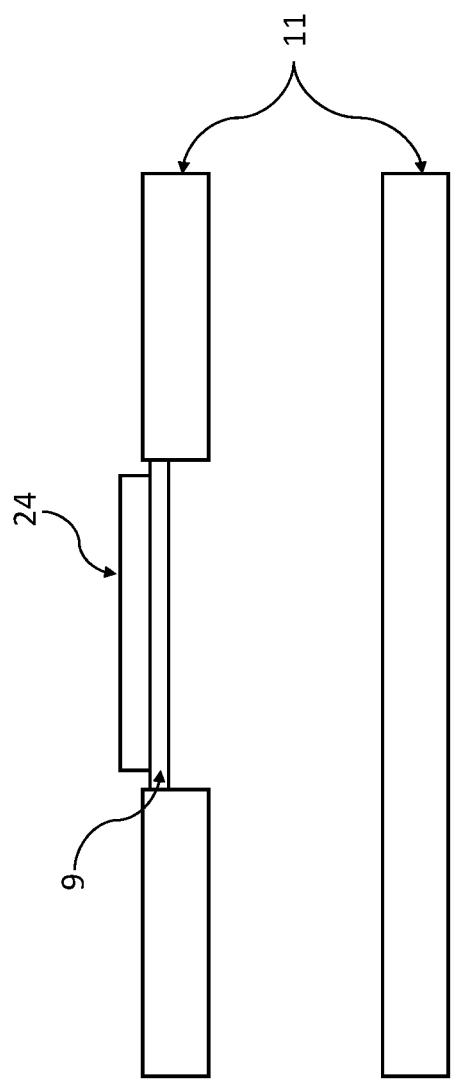
FIG. 8 shows an embodiment using a piezo element.
Figure 9:
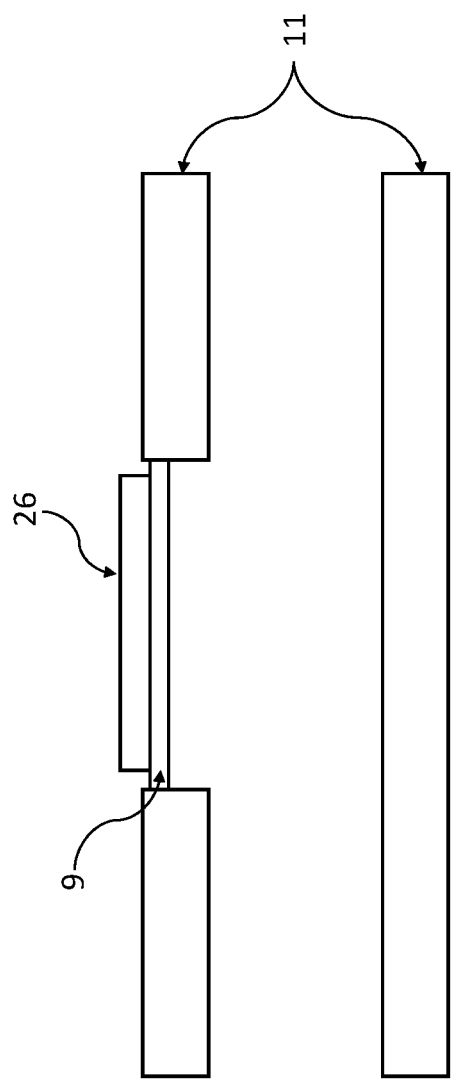
FIG. 9 shows an embodiment with expansion elements.

A piezo element 24 may also be used for determining the deformation of the flexible foil 9 (FIG. 8). A piezo element 24 deforms when an electrical voltage is applied or generates an electrical voltage when it is mechanically deformed. In contrast to the capacitive process, the flexible foil 9 is not conductively coated in this embodiment, but it is directly bonded to a piezo foil 24. Alternatively, the piezo film 24 could also be used directly as a flexible foil 9 for at least partly replacing the sleeve 11 of the splitter channel. The voltage generated by the deformation of the piezo element 24 is then again identical to the oscillation frequency of the nozzle Expansion elements 26 may also be used for determining differences in the deformation of the flexible foil 9 (FIG. 9) which at least partly replaces the sleeve 11 of the splitter channel. An expansion element 26 changes its electrical resistance when it is deformed. This method is similar to the piezo electrical method, described above, with the difference that a change in resistance is detected.

Figure 10:
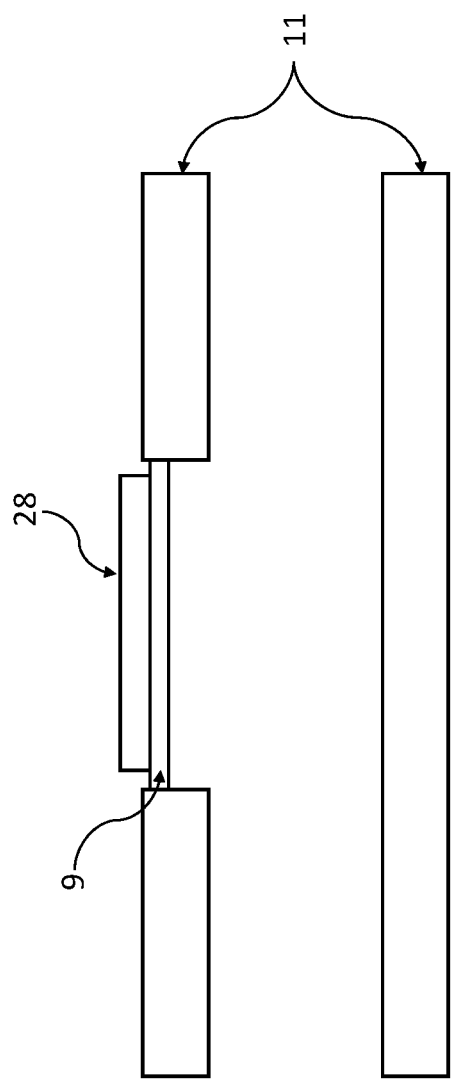
FIG. 10 shows an embodiment employing an acceleration sensor.

Another possibility for determining the deformation of the foil which at least partly replaces the sleeve 11 of the splitter channel, is the use of an acceleration sensor 28 (FIG. 10). An accelerometer or the acceleration sensor 28 is mounted directly on the flexible foil 9 and can thus directly measure the vibration/pulsation/deformation of the flexible foil 9. However, this method is probably also susceptible to vibration in the direct environment.

Figure 11B:
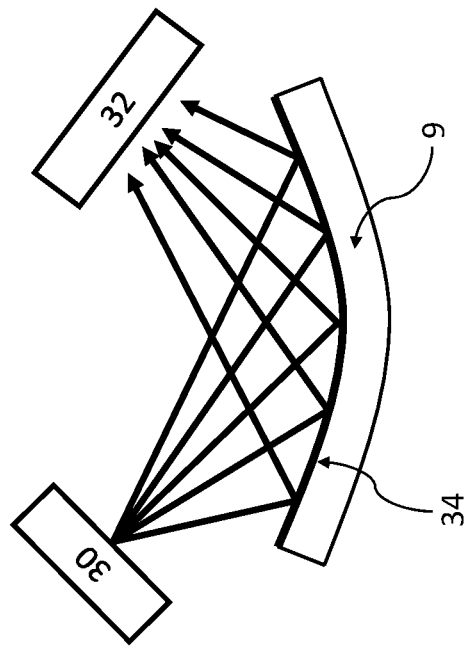
FIGS. 11A and 11B show an optical detection using a foil which has a reflective coating.
Figure 11A:
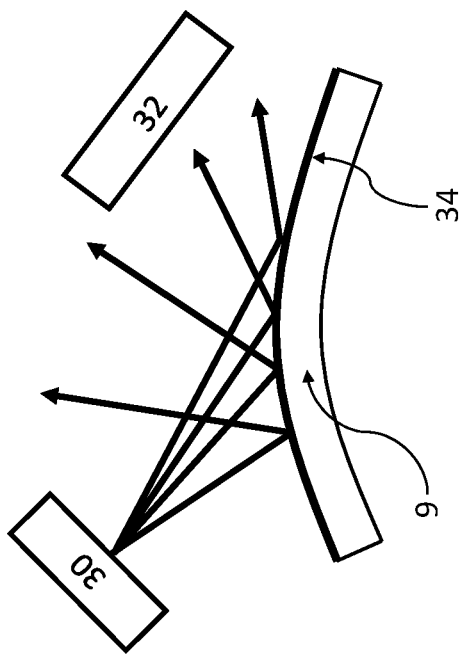

It is also conceivable to determine optically the bending of the deformed foil 9 (FIGS. 11A and 11B). In this process, the flexible foil 9 is coated with a reflective coating 34. By the suitable arrangement of a light source 30 and a light sensor 32 the deformation of the flexible foil 9 can be measured, because sometimes more times less light is reflected into the sensor 32 or the reflected light hits at different places of the sensor 32 or when using several sensors 32 at different positions.

Figure 12:
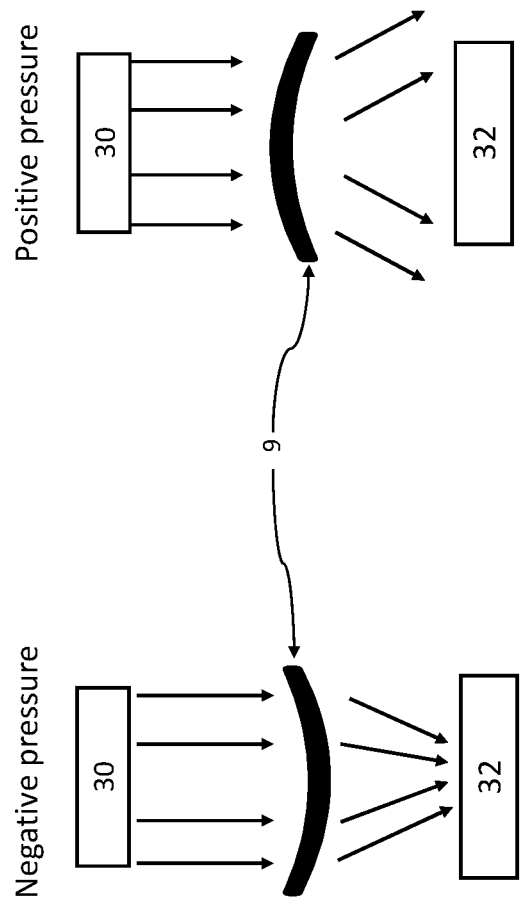
FIG. 12 shows an embodiment where a change of the focal length is use for determining the deformation of the foil.

An alternative to the above-described optical determination is to employ a method where the light source 30 is not reflected but focused by the film and the liquid behind it (FIG. 12). Such a method is thus based on a change of the focal length.

Figure 13:
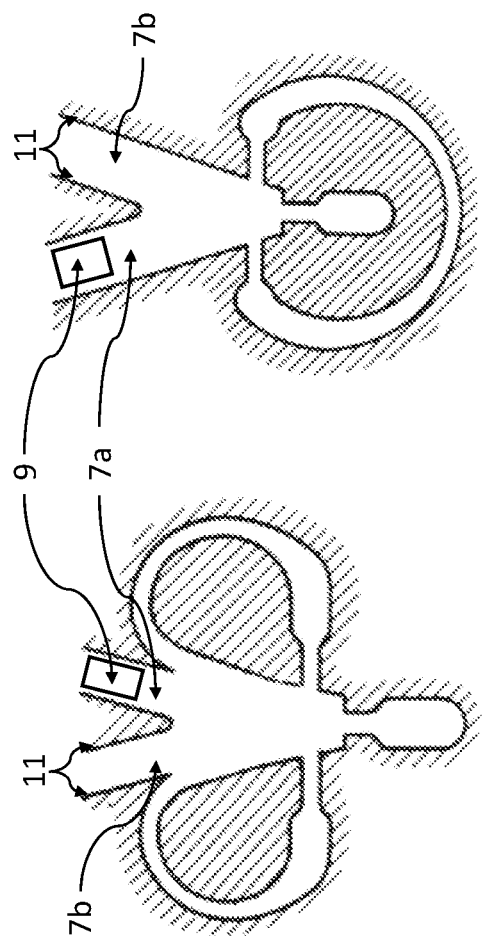
FIG. 13 shows alternatives to the splitter channel shape.

Alternative approaches may encompass embodiments with a different geometry of the oscillating nozzle, wherein again at least partly the sleeve 11 of a splitter channel is replaced by a flexible foil (comp. FIG. 13).

Figure 14A:
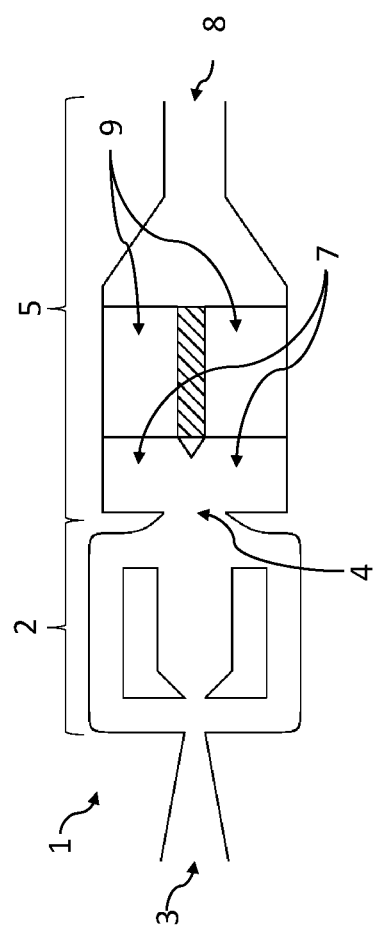
FIGS. 14A and 14B show an embodiment with flexible foils that are arranged within the splitter channel in two layers.
Figure 14B:
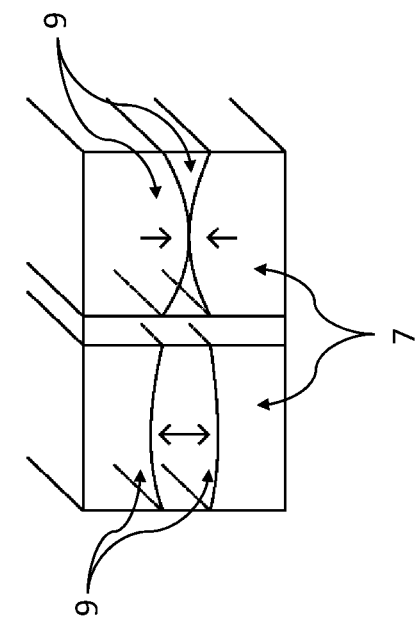

FIGS. 14A and 14B show another alternative embodiment of channels of the splitter 5 which are bordered by flexible foils 9 which are only mounted to the rim so that they may move in their middle part. These two foils may also be coated with a conductive material like a metal from the outside (i.e., electrically insulated from each other) and form an electrical capacitor. In the resting state, the foils lie against each other, their distance against each other is close to zero. When the current liquid flows through them, the foils are driven apart and the capacitance changes which can be determined, e.g., it increases because a signal stroke results from the increased distance between the foils.

The advantages of the invention can be summarized as follows:
Contactless measurement of the oscillation frequency and thus the flow rate
No moving parts in the system
High measuring frequency possible/fast response
Direct measurement on the film, therefore less susceptible to interference
Partially non-contact measurement, i.e., measuring electronics and measuring chamber can be exchanged independently of each other, the measuring chamber could therefore also be used as a low-cost disposable part.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS

1 oscillating nozzle
2 fluidic oscillator
3 inlet fluidic oscillator
4 outlet fluidic oscillator
5 splitter
7 splitter channel
7*a* first splitter channel
7*b* second splitter channel
8 outlet splitter
9 flexible foil
11 sleeve splitter channel
11*a* sleeve first splitter channel
11*b* sleeve second splitter channel
13 conductive layer
14 counter electrode
15 capacitor
17 circuit board
19 inductive sensor
20 housing
20*a* resulting chamber
21 pressure sensor
22 differential pressure sensor
24 piezo element
26 expansion element
28 acceleration sensor
30 light source
32 light sensor
34 reflective coating

We claim:
1. An oscillating nozzle, comprising:
a fluidic oscillator with inlet and outlet and a main channel and at least one control passage surrounding the main channel, and
a splitter comprising at least two splitter channels merging to an outlet of the splitter, and forming at least two unrestricted fluid flow paths, wherein the splitter is attached to the outlet of the fluidic oscillator and arranged downstream from the fluidic oscillator, wherein at least one of the at least two splitter channels comprises a sleeve having a flexible foil configured to be position in direct communication with a fluid in the at least two splitter channels and in between the outlet of the fluidic oscillator and the outlet of the splitter, wherein the flexible foil is configured to measurably deform concavely or convexly in response to pressure changes in the at least one of the at least two splitter channels.

2. The nozzle of claim 1, wherein the outlet of the fluidic oscillator before the splitter is a gorge portion.

3. The nozzle of claim 1, wherein the outer surface of the flexible foil is coated with a conductive material.

4. The nozzle of claim 3, wherein two counter electrodes are arranged with a predefined distance next to the conductively coated outer surface of the flexible foil.

5. The nozzle of claim 4, wherein the two counter electrodes are part of a circuit board.

6. The nozzle of claim 3, wherein a single counter electrode is configured to be in a distance next to the conductively coated outer surface of the flexible foil so that the conductive coating of the outer surface of the flexible foil and a surface of the single counter electrode are configured to measure a capacity change.

7. The nozzle of claim 3, wherein an inductive sensor is arranged with a predefined distance next to the conductively coated outer surface of the flexible foil.

8. The nozzle of claim 1, wherein the flexible foil is on the outer surface of the sleeve surrounded by a sealed housing and a pressure sensor is arranged within the said sealed housing.

9. The nozzle of claim 1, wherein each of the at least two splitter channels is partly covered with the flexible foil and each of the flexible foils is surrounded by a sealed housing, wherein the housings are connected by a channel which comprises a differential pressure sensor.

10. The nozzle of claim 1, wherein a piezo element or a piezo foil is attached to the outer surface of the flexible foil.

11. The nozzle of claim 1, wherein a strain gauge is attached to the outer surface of the flexible foil.

12. The nozzle of claim 1, wherein an acceleration sensor is attached to the outer surface of the flexible foil.

13. The nozzle of claim 1, wherein the outer surface of the flexible foil is coated with a reflecting material.

14. The nozzle of claim 13, wherein a light source illuminates the reflective outer surface of the flexible foil and a light sensor detects the amount and/or direction of reflected light.

15. The nozzle of claim 1, wherein the flexible foil is made of a translucent material and a light source which is arranged outside the splitter channel illuminates through the flexible foil the inner volume of the splitter channel and a light sensor is arranged inside the splitter channel opposite the translucent flexible foil for detecting the amount and/or direction of light passing through the foil.

16. A method for monitoring a dispensed fluid jet, comprising the steps of: providing an oscillating nozzle comprising:
    a fluidic oscillator with inlet and outlet and a main channel and at least one control passage surrounding the main channel; and
    a splitter comprising at least two splitter channels merging to an outlet of the splitter, and forming at least two unrestricted fluid flow paths, wherein the splitter is attached to the outlet of the fluidic oscillator and arranged downstream from the fluidic oscillator, wherein at least one of the at least two splitter channels comprises a sleeve having a flexible foil configured to be position in direct communication with a fluid in the at least two splitter channels and in between the outlet of the fluidic oscillator and the outlet of the splitter, wherein the flexible foil is configured to measurably deform concavely or convexly in response to pressure changes in the at least one of the at least two splitter channels; and
    injecting a fluid jet and in parallel determining the oscillation frequency by determining the deformation changes of the flexible foil.

17. The method of claim 16, wherein the oscillation frequency of the fluid is determined by measuring capacity changes, electromagnetic induction, pressure changes, differential pressure changes, piezoelectricity, changes of the shape of the flexible form and acceleration on the surface of the flexible foil or refractive changes of a translucent flexible foil.

* * * * *